(12) United States Patent
Watanabe et al.

(10) Patent No.: US 7,204,949 B2
(45) Date of Patent: Apr. 17, 2007

(54) METHOD OF MANUFACTURING A PLASTIC LAMINATE BODY

(75) Inventors: Jun Watanabe, Kanagawa (JP); Yasunori Sugimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 290 days.

(21) Appl. No.: 10/800,647

(22) Filed: Mar. 16, 2004

(65) Prior Publication Data
US 2004/0241383 A1   Dec. 2, 2004

(30) Foreign Application Priority Data
Mar. 20, 2003   (JP)   ............... 2003-077198
Nov. 7, 2003   (JP)   ............... 2003-378557

(51) Int. Cl.
*B29B 13/02*   (2006.01)

(52) U.S. Cl. ............... 264/271.1; 264/259; 264/322

(58) Field of Classification Search ............... None
See application file for complete search history.

(56) References Cited

U.S. PATENT DOCUMENTS

| | | | | |
|---|---|---|---|---|
| 3,097,982 A | * | 7/1963 | Stoner | ............... 156/211 |
| 3,953,056 A | * | 4/1976 | Roberts | ............... 281/29 |
| 4,124,421 A | * | 11/1978 | Fujii | ............... 156/87 |
| 4,249,976 A | * | 2/1981 | Hudson | ............... 156/286 |
| 4,379,039 A | * | 4/1983 | Fujimoto et al. | ............... 522/16 |
| 5,041,182 A | * | 8/1991 | Sekiguchi et al. | ............... 156/245 |
| 5,603,871 A | | 2/1997 | Koseko et al. | |
| 5,853,627 A | | 12/1998 | Watanabe | |
| 6,465,610 B1 | | 10/2002 | Kishi et al. | |
| 6,565,785 B1 | * | 5/2003 | Ishikawa | ............... 264/166 |

FOREIGN PATENT DOCUMENTS

| | | |
|---|---|---|
| JP | 1-316702 | 12/1989 |
| JP | 3-82513 | 4/1991 |
| JP | 5-154933 | 6/1993 |
| JP | 7-178834 | 7/1995 |
| JP | 2831959 | 12/1998 |
| JP | 2000-326360 | 11/2000 |

* cited by examiner

*Primary Examiner*—Richard Crispino
*Assistant Examiner*—Barbara Musser
(74) *Attorney, Agent, or Firm*—Oblon, Spivak, McClelland, Maier & Neustadt, P.C.

(57) ABSTRACT

A manufacturing method of a plastic laminate body, the plastic laminate body having at least one plastic laminate member that is laminated on a plastic substrate, which plastic substrate is pre-processed in advance so as to have a substantially final configuration, the manufacturing method includes softening the plastic laminate member when a transfer surface of a mold member, which is pre-processed in advance so as to have a desired configuration, is transferred to a surface of the plastic laminate member, so that an excessive part of the plastic laminate member is moved to an escape part which is pre-formed at the plastic substrate.

14 Claims, 16 Drawing Sheets

(A)

(B)

FIG.4
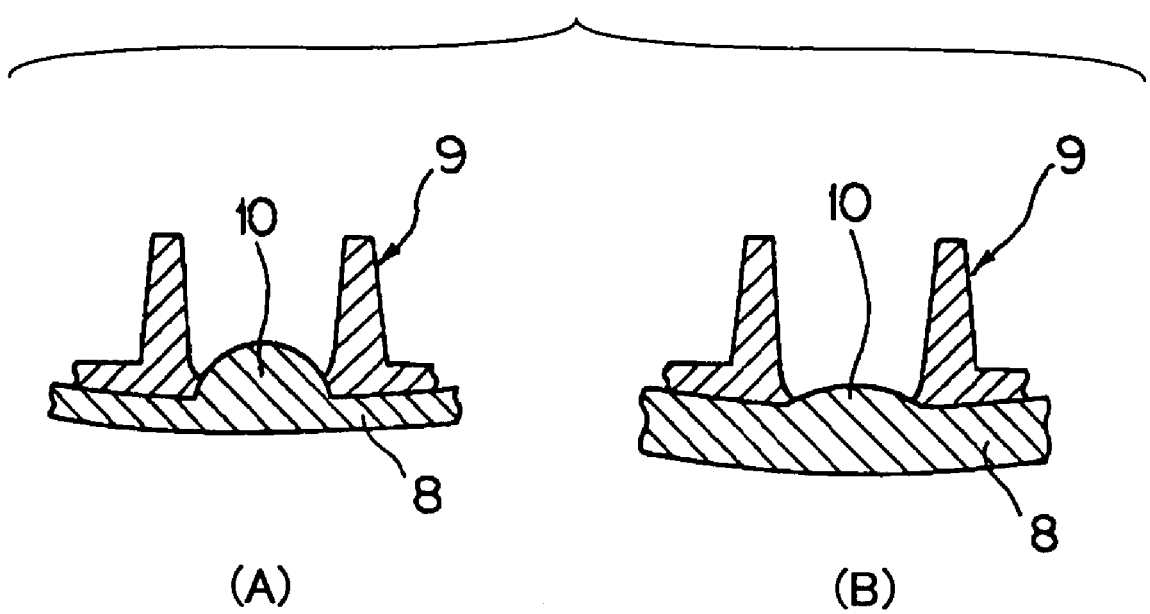
(A)    (B)
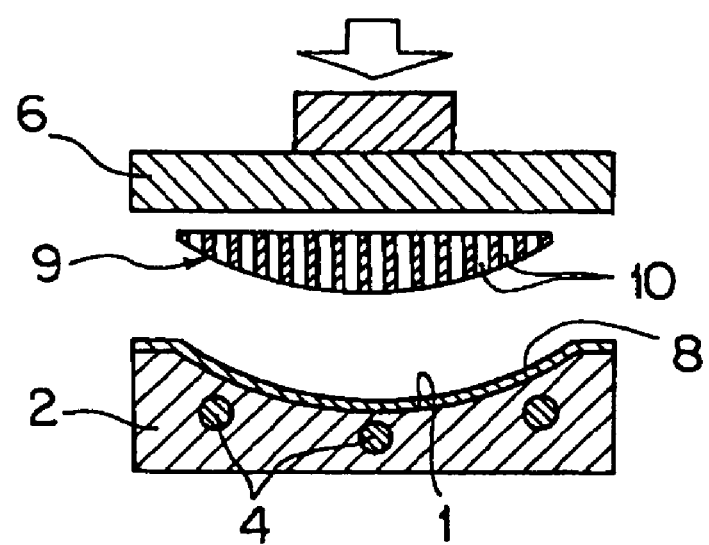
FIG.5

FIG.9
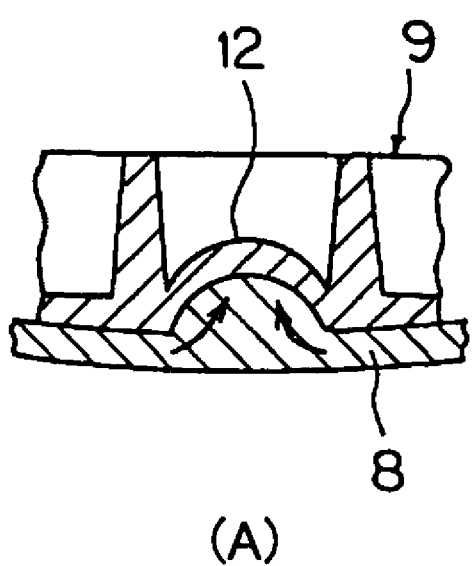
(A)
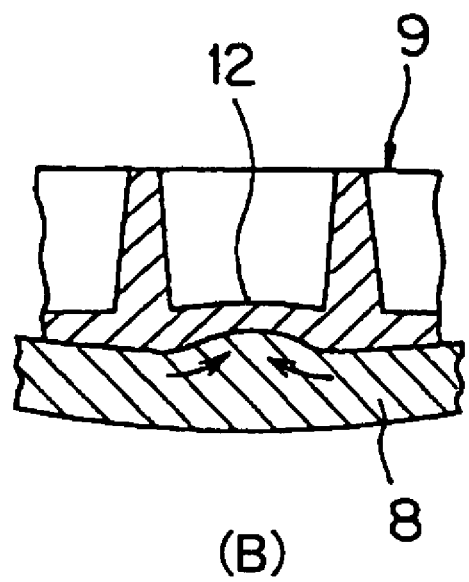
(B)

METHOD OF MANUFACTURING A PLASTIC LAMINATE BODY

BACKGROUND OF THE INVENTION

1. Field of the Invention

The present invention generally relates to plastic laminated bodies, manufacturing methods of the same, and rear projection type image display apparatuses, and more particularly, to a manufacturing method of a plastic laminate body such as a composite plastic molding article made by laminating a plurality of plastics, an optical element having a transfer surface (reflection surface) having high precision like a plastic reflection mirror, or the like.

2. Description of the Related Art

As a method and an apparatus by which two members are laminated and a transfer surface is transferred to one of the members, there are the contact bonding method and the apparatus shown in Japanese Laid-Open Patent Application No. 1-316702. In the method and apparatus, a lens sheet part is heated and made molten so as to be developed and extended on a lens mold surface, and then a translucent member is contact-bonded. In this method, it is necessary to make the lens sheet thick in order to cover the curvature in a case where a subject configuration is a curved surface. Because of this, it is required to take a lot of time for heating, melting, and solidifying the lens sheet, and this causes increasing cost. Furthermore, thicknesses of some parts of the lens sheet become uneven, and therefore it is difficult to apply pressure to the entire transfer surface evenly. Because of this, as shown in FIG. 2, an uneven contraction occurs after the contact bonding process and therefore it is difficult to manufacture a molded article with high precision.

In Japanese Laid-Open Patent Application No. 3-82513, Japanese Laid-Open Patent Application No. 5-154933, Japanese Laid-Open Patent Application No. 7-178834, and Japanese Laid-Open Patent Application No. 2000-326360, a method for providing a reflection film, where a metal layer is formed in advance in a mold, then injecting and filling a resin from a back surface of the reflection film so as to unify, is suggested. In this case, the film has to be fixed in the mold in order to prevent wrinkles from being generated and therefore the mold structure is complex. Furthermore, if it is attempted to make the film correspond to a curved surface, the film is adversely influenced by high temperature at the time of resin injection and flow pressure on the assumption of uniformity by injection molding. This causes generation of wrinkles and tears of the film. If the molded article is made thick for securing strength of the molded article, it takes more time for cooling and the molding cycle increases. Furthermore, if the thickness of the molded article is not uniform, pressure at the thick wall part and pressure at the thin wall part do not become uniform, so that it is difficult to secure high configuration precision only by injection molding.

In Japanese Patent No. 2831959, first, more than two plastic base materials prepared in advance are inserted into the mold, and a transfer due to self expansion and uniformity are realized by heating at a temperature higher than a softening temperature of the plastic base materials. Next, the plastic base materials are cooled so as to have a temperature less than a heat deformation temperature and then pulled out. In this case, although there is no influence of unevenness of resin pressure and resin flow, it takes a lot of time for molding because all of the base material is heated and cooled. This causes an increase of cost.

There is a unifying way by heat contact bonding that can prevent the above-discussed influence by the resin flowing and the increase of the molding cycle, comprising a manufacturing method of a plastic laminate body such as a composite plastic molding article made by laminating a plurality of plastics, including an optical element having a transfer surface (reflection surface) having high precision, such as a plastic reflection mirror.

However, according to the related art unifying way by heat contact bonding, there are the following problems in a case where the subject configuration includes a curved surface.

FIG. 1 is a schematic view showing a related art manufacturing method of a plastic laminate body. More specifically, related art wherein two members are bonded in one body by heat contact bonding and a transfer surface is transferred to either of the members, is shown in FIG. 1. A thermal plastic material 3 is heated and melted on a lower mold member 2 having a transfer surface 1 in advance by a heater 4. And then, an upper mold member 6 is lowered down on the lower mold member 2 via the substrate 5 so as to pressurize (See FIG. 1-(A)) and therefore the thermal plastic material 3 and the substrate 5 are contact-bonded (See FIG. 1-(B)). In this case, as shown in FIG. 1, since the desired configuration contains a curved surface, the thickness of the thermal plastic material 3 is different depending on parts indicated by marks "A" and "B". As a result of this, a pressure distribution (non-uniform pressure distribution) occurs at the time of pressuring so that a load cannot be given to the entire transfer surface. Because of this, a contraction after contact bonding becomes uneven so that it is difficult to transfer the transfer surface 1 of the mold member 2 to a surface of a laminate body 7 with high precision.

FIG. 2 is a schematic view of another example of the related art manufacturing method of the plastic laminate body. More specifically, a case where the substrate 5 is processed in advance to be curved is used for pressurizing is shown in FIG. 2. In this case, however, as shown in FIG. 2, if the substrate 5 and the lower mold member 2 having the transfer surface 1 are not positioned with high precision, the thickness of the thermal plastic material 3 is different depending on parts indicated by marks "C" and "D". Hence, it is still difficult to sufficiently reduce the pressure distribution at the time of pressuring. In addition, even if the substrate 5 and the lower mold member 2 having the transfer surface 1 are positioned with high precision, in a case where configuration error between the substrate 5 and the transfer surface 1 of the lower mold member 2 differs depending on positions, there is still uneven pressure distribution like the case shown in FIG. 1.

That is, if particularly the desired configuration is a curved surface, there is an uneven pressure distribution at the time of pressurizing due to the configuration error of the plastic substrate and the member having the transfer surface, so that the contraction after contact bonding becomes uneven. This causes a problem in that it is difficult to transfer the transfer surface with high precision.

SUMMARY OF THE INVENTION

Accordingly, it is a general object of the present invention to provide a novel and useful plastic laminate body, manufacturing method of the same, and a rear projection type image display apparatus in which one or more of the problems described above are eliminated.

Another and more specific object of the present invention is to provide a structure wherein a pressure distribution problem is solved by an escape part. More specifically, the present invention is directed to a plastic laminate body, manufacturing method of the same, and a rear projection type image display apparatus, wherein an escape part, where an excessive part of the laminate member is moved is formed at a plastic substrate in advance, the laminate member is heated and softened, and the excessive part of the laminate member is moved to the escape part. As a result of this, the distribution problem can be solved so that the pressure is made even and therefore surface transferring with high precision can be realized.

The above objects of the present invention are achieved by a manufacturing method of a plastic laminate body, the plastic laminate body having at least one plastic laminate member that is laminated on a plastic substrate, which plastic substrate is pre-processed in advance so as to have a substantially final configuration, the manufacturing method including:

softening the plastic laminate member when a transfer surface of a mold member, which is pre-processed in advance so as to have a desired configuration, is transferred to a surface of the plastic laminate member, so that an excessive part of the plastic laminate member is moved to an escape part which is pre-formed at the plastic substrate.

In the manufacturing method, the transfer surface of the mold member may be pushed to the plastic laminate member with pressure so that the transfer surface of the mold member is transferred to the surface of the plastic laminate member.

According to the above mentioned invention as described above, it is possible to reduce a pressure distribution at the time of pressurizing and realize surface transferring with high precision, by moving excessive resin of the plastic laminate member to the escape part of the substrate.

In the manufacturing method, the plastic substrate may have a honeycomb structure, and an opening part of the honeycomb structure may be formed as the escape part to which the excessive part of the plastic laminate member is moved.

According to the above mentioned invention as described above, it is further possible to secure rigidity of the plastic laminate body and reduce the weight of the plastic laminate body.

In the manufacturing method, the plastic substrate may have a honeycomb structure, a thin wall part may be formed at a side of a laminate surface of the plastic laminate member, of an opening part of the honeycomb structure, and the escape part, to which the excessive part of the plastic laminate member is moved, may be formed by deforming the thin wall part according to pressure loaded at the time when the mold member is pushed with the pressure.

According to the above mentioned invention as described above, the thin wall part formed at the opening part having the honeycomb configuration is modified and the excessive resin of the plastic laminate member is moved to the thin part, so that the excessive resin does not continue moving to the opening part and therefore the pressure distribution can be reduced stably without being influenced by the degree of viscosity.

In the manufacturing method, a thickness of the thin wall part may be equal to or more than 10 μm and equal to or less than 500 μm.

According to the above mentioned invention as described above, the thin wall part is prevented from being broken at the time when the plastic laminate member and the plastic substrate are bonded in one body and a deformation for easing the pressure distribution can be made, by making the thickness of the thin wall part equal to or more than 10 μm and equal to or less than 500 μm.

In the manufacturing method, the plastic substrate having the honeycomb structure may be formed by filling a mold with a molten resin at high pressure, wherein a plurality of pins for forming the honeycomb structure at a cavity are provided.

According to the above mentioned invention as described above, it is possible to easily manufacture the substrate at low cost by injection molding.

In the manufacturing method, gas may be given to an interface of the pins and the resin before the pins provided in the cavity of the mold are pulled out from the resin filling the cavity.

According to the above mentioned invention as described above, it is possible to reduce mold release resistance at the time of mold releasing when the substrate is manufactured by injection molding, and therefore it is possible to prevent a deformation at the time when the substrate having the honeycomb configuration is released from the mold.

In the manufacturing method, the plastic substrate may be formed by a porous body, and a porous part of the porous body may be formed as the escape part to which the excessive part of the plastic laminate member is moved.

According to the above mentioned invention as described above, since the plastic substrate is formed by a porous body, it is possible to easily manufacture the substrate at a low cost.

In the manufacturing method, the plastic substrate may be formed by including a foaming material when the plastic substrate is molded.

According to the above mentioned invention as described above, since the plastic substrate is formed by including a foaming material when the plastic substrate is molded, it is possible to easily manufacture the substrate formed by the porous body at a low cost.

In the manufacturing method, the plastic laminate member may be softened at the time when the mold member is pushed with pressure, so that a substantial final and desired surface configuration of the plastic substrate is corrected and the plastic laminate member and the plastic substrate are bonded in one body.

According to the above mentioned invention as described above, the plastic laminate member is softened at the time of pressurizing so that a surface configuration of the substrate is corrected to a transfer surface configuration (the substantial final and desired surface configuration) of the mold member, surface transferring can be done with high precision, and the plastic laminate member and the plastic substrate are strongly bonded in one body.

In the manufacturing method, a plastic intermediate layer may be inserted between the plastic laminate member and the plastic substrate, and the plastic intermediate layer may be softened at the time when the mold member is pushed with pressure, so that a substantial final and desired surface configuration of the plastic substrate is corrected and the plastic laminate member and the plastic substrate are bonded in one body.

According to the above mentioned invention as described above, the plastic intermediate layer is inserted between the plastic laminate member and the plastic substrate, and the plastic intermediate layer is softened at the time of pressurizing so that the plastic laminate member and the plastic substrate can be bonded in one body without softening the laminate body and therefore a function can be added to the laminate member in advance.

In the manufacturing method, a structural member of the plastic laminate member may be formed by a thermoplastic member whose softening temperature T1 is lower than a softening temperature T2 of a structural member of the plastic substrate, and the plastic laminate member may be heated so as to have a temperature equal to and more than the softening temperature T1 and equal to and less than the softening temperature T2 when the mold member is pushed with the pressure after the plastic laminate member is laminated on a laminate surface of the plastic substrate, so that the plastic laminate member and the plastic substrate are bonded in one body.

In the manufacturing method, a structural member of the plastic intermediate layer may be formed by a thermoplastic member whose softening temperature T3 is lower than a softening temperature T2 of a structural member of the plastic substrate, and the plastic laminate member may be heated so as to have a temperature equal to or more than the softening temperature T3 and equal to or less than the softening temperature T2 when the mold member is pushed with the pressure after the plastic intermediate layer and the plastic laminate member are laminated in turn on a laminate surface of the plastic substrate, so that the plastic laminate member and the plastic substrate are bonded in one body.

According to the above mentioned invention as described above, the plastic laminate member and the plastic substrate can be strongly bonded in one body without softening the laminate body, and therefore it is possible to shorten the processing cycle at the time when the plastic laminate member and the plastic substrate are being bonded in one body.

In the manufacturing method, a structural member of the plastic laminate member may be formed by an ultraviolet curing type resin and an ultraviolet light may be applied when the mold member is pushed with the pressure after the plastic laminate member is laminated on a laminate surface of the plastic substrate, so that the plastic laminate member and the plastic substrate are bonded in one body.

In the manufacturing method, a structural member of the plastic intermediate layer may be formed by an ultraviolet curing type resin and an ultraviolet light may be applied when the mold member is pushed with the pressure after the plastic intermediate layer and the plastic laminate member are laminated in turn on a laminate surface of the plastic substrate, so that the plastic laminate member and the plastic substrate are bonded in one body.

According to the above mentioned invention as described above, the structural member of the plastic laminate member or the intermediate layer is formed by the ultraviolet curing type resin, the laminate member is laminated on the laminate surface of the substrate, and the ultraviolet light is applied at the time of pressuring, so that the plastic laminate member and the plastic substrate are bonded in one body. Hence, heating and cooling processes are not necessary and therefore it is possible to shorten the processing cycle.

In the manufacturing method, structural members of the plastic substrate and the plastic laminate member may be formed under conditions that a multiplied result of a dielectric constant $\epsilon$ and a dielectric tangent $\delta$ of the plastic substrate is smaller than 0.01, namely $\epsilon \times \tan \delta < 0.01$, and a multiplied result of a dielectric constant $\epsilon'$ and a dielectric tangent $\delta'$ of the plastic laminate member is larger than 0.01, namely $0.01 < \epsilon' \times \tan \delta'$, and the plastic laminate member may be softened by a high frequency dielectric heating process, when the mold member is pushed with the pressure after the plastic laminate member is laminated on a laminate surface of the plastic substrate, so that the plastic laminate member and the plastic substrate are bonded in one body.

In the manufacturing method, structural members of the plastic substrate and the plastic laminated member or the plastic intermediate layer may be formed under conditions that a multiplied result of a dielectric constant $\epsilon$ and a dielectric tangent $\delta$ of the plastic substrate is smaller than 0.01, namely $\epsilon \times \tan \delta < 0.01$, and a multiplied result of a dielectric constant $\epsilon'$ and a dielectric tangent $\delta'$ of the plastic laminated member or the plastic intermediate layer is larger than 0.01, namely $0.01 < \epsilon' \times \tan \delta'$, and the plastic laminate member or the plastic intermediate layer may be selectively softened by a high frequency dielectric heating process, when the mold member is pushed with the pressure after the plastic intermediate layer and the plastic laminate member are laminated in turn on a laminate surface of the plastic substrate, so that the plastic laminate member and the plastic substrate are bonded in one body.

According to the above mentioned invention as described above, structural members of the plastic substrate and the plastic laminated member or the plastic intermediate layer are formed under conditions that the multiplied result of the dielectric constant $\epsilon$ and the dielectric tangent $\delta$ of the plastic substrate is smaller than 0.01, namely $\epsilon \times \tan \delta' < 0.01$, and the multiplied result of the dielectric constant $\epsilon'$ and the dielectric tangent $\delta'$ of the plastic laminated member or the plastic intermediate layer is larger than 0.01, namely $0.01 < \epsilon' \times \tan \delta'$, the plastic laminate member is laminated on the laminate surface of the substrate, and only the plastic laminate member or plastic intermediate layer is softened by the high frequency dielectric heating process at the time of pressurizing. As a result of this, the plastic laminate member and the plastic substrate are bonded in one body, and selective heating process can be applied. Furthermore, since heating response is extremely rapid, it is possible to shorten the processing cycle.

In the manufacturing method, the plastic intermediate layer may be formed by a heat curing type bonding member whose bonding temperature is lower than a softening temperature of the plastic substrate or a hot melt type bonding member, and a heating or pressurizing process may be applied so that the plastic laminate member and the plastic substrate are bonded in one body.

According to the above mentioned invention as described above, the plastic laminate member and the plastic substrate can be strongly bonded in one body without softening the laminate body.

In the manufacturing method, the plastic laminate member may be formed by a plastic film having a thickness equal to or less than 0.5 mm.

According to the above mentioned invention as described above, it is possible to easily modify the laminate member so as to have a desired configuration. Furthermore, in a case where a function is applied to the laminate member in advance, the laminate member can be used as forming a roll. Therefore, the function can be easily given at low cost.

The above object of the present invention is also achieved by a plastic laminate body manufactured by a manufacturing method, the plastic laminate body having at least one plastic laminate member that is laminated on a plastic substrate, which plastic substrate is pre-processed in advance so as to have a substantially final configuration, the manufacturing method including:

softening the plastic laminate member when a transfer surface of a mold member, which is pre-processed in advance so as to have a desired configuration, is transferred to a surface of the plastic laminate member, so that an excessive part of the plastic laminate member is moved to an escape part which is pre-formed at the plastic substrate, wherein a metal reflection film is pre-formed on a surface of the plastic laminate member.

According to the above mentioned invention as described above, it is possible to provide a plastic mirror having a light weight at low cast and with high precision and rigidity by manufacturing the reflection mirror with the above mentioned manufacturing method.

The above object of the present invention is also achieved by a rear projection type image display apparatus, including:

a plastic laminate body which is used as a projecting mirror, the plastic laminate body having at least one plastic laminate member that is laminated on a plastic substrate, which plastic substrate is pre-processed in advance so as to have a substantially final configuration, the plastic laminate body being manufactured by a manufacturing method, including:

softening the plastic laminate member when a transfer surface of a mold member, which is pre-processed in advance so as to have a desired configuration, is transferred to a surface of the plastic laminate member, so that an excessive part of the plastic laminate member is moved to an escape part which is pre-formed at the plastic substrate, wherein a metal reflection film is pre-formed on a surface of the plastic laminate member.

According to the above mentioned invention as described above, it is possible to manufacture a rear projection type image display apparatus having high image quality and low weight at a low cost.

Other objects, features, and advantages of the present invention will become more apparent from the following detailed description when read in conjunction with the accompanying drawings.

BRIEF DESCRIPTION OF THE DRAWINGS

FIG. 4 is an enlarged view of a main part of a honeycomb-shaped substrate of the plastic laminate body shown in FIG. 3;

FIG. 5 is a schematic view showing another example of a modifying method of the laminate member provided at the plastic laminate body of the first embodiment of the present invention;

FIG. 9 is an enlarged view of a main part of a honeycomb-shaped substrate of the plastic laminate body shown in FIG. 8;

DETAILED DESCRIPTION OF THE PREFERED EMBODIMENTS

A description will now be given, with reference to FIG. 3 through FIG. 19, of embodiments of the present invention.

Figure 3:
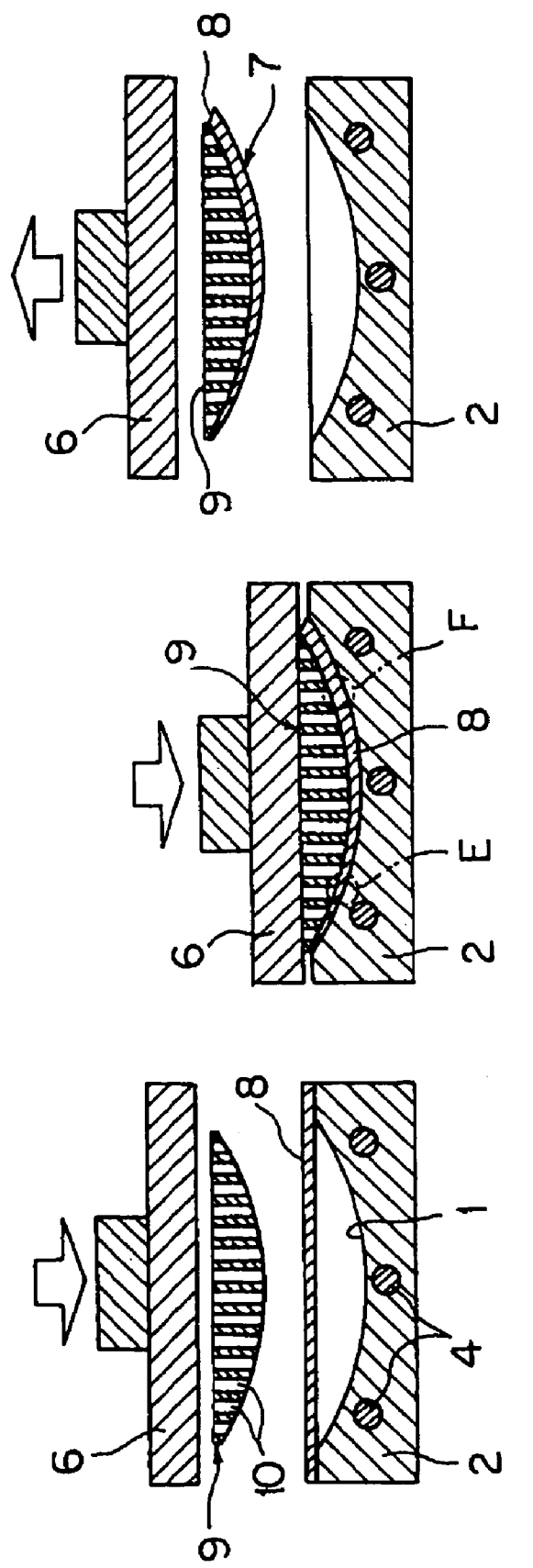
FIG. 3 is a schematic view showing a structure of a plastic laminate body and a manufacturing method of the same of a first embodiment of the present invention.

FIG. 3 is a schematic view showing a structure of a plastic laminate body and a manufacturing method of the same of a first embodiment of the present invention. As shown in FIG. 3, an upper mold member .6 and a lower mold member 2 are provided so as to face each other. A transfer surface 1 having at least one desired configuration is formed at the lower mold member 2. A heater 4 for heating is provided in the lower mole member 2. A film-shaped laminate member 8 made of an acrylic resin is fixed on the lower mold member 2. A honeycomb-shaped substrate 9 is inserted between the laminate member 8 and the upper member 6 having the transfer surface 1. See FIG. 3-(A). The substrate 9 is processed in advance so that a surface of the substrate 9 is a substantially final desired configuration. In this embodiment, a polycarbonate resin whose softening temperature is approximately 150° C. is used as a structural member of the honeycomb-shaped substrate 9, and an acrylic resin whose softening temperature is 105° C. is used as a structural member of the laminate member 8.

Next, an operation in the first embodiment is discussed. The upper mold member 6 is lowered down in a state shown in FIG. 3-(A). At this time, the film-shaped laminate member 8 is pushed with pressure by the honeycomb-shaped substrate 9 so as to have a curved surface configuration. Next, the laminate member 8 comes in contact with the transfer surface 1 of the lower mold member 2. Finally, two members, namely the honeycomb substrate 9 and the laminate member 8, are pressurized and bonded. See FIG. 3-(B). At this time, a heating process is done at 120° C., which is higher than the softening temperature of the acrylic resin forming the laminate member 8 and lower than softening temperature of the polycarbonate resin forming the honeycomb-shaped substrate 9, by the heater 4 provided in the lower mold member 2. Next, after a cooling process is done at 100° C. that is lower than the softening temperature of the acrylic resin, the upper mold member 6 is raised so that the unified laminate body 7 is picked out. See FIG. 3-(C).

Figure 1:
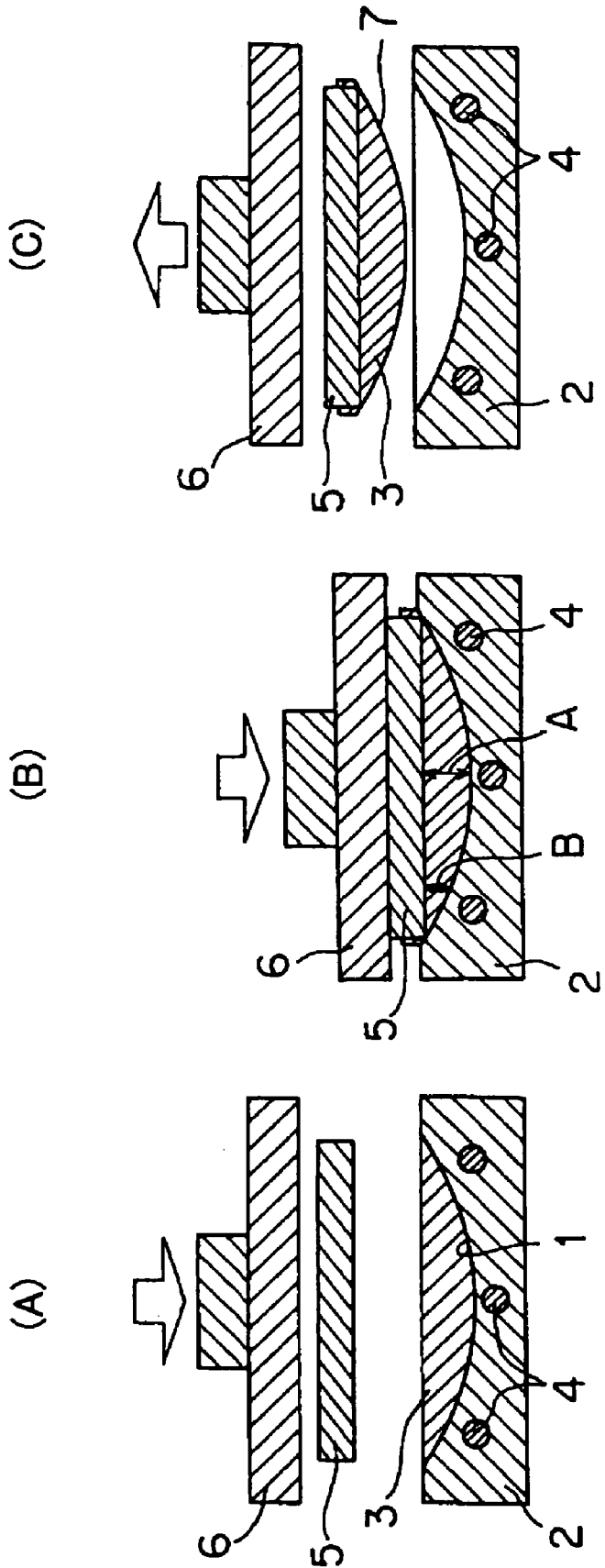
FIG. 1 is a schematic view showing a related art manufacturing method of a plastic laminate body.
Figure 2:
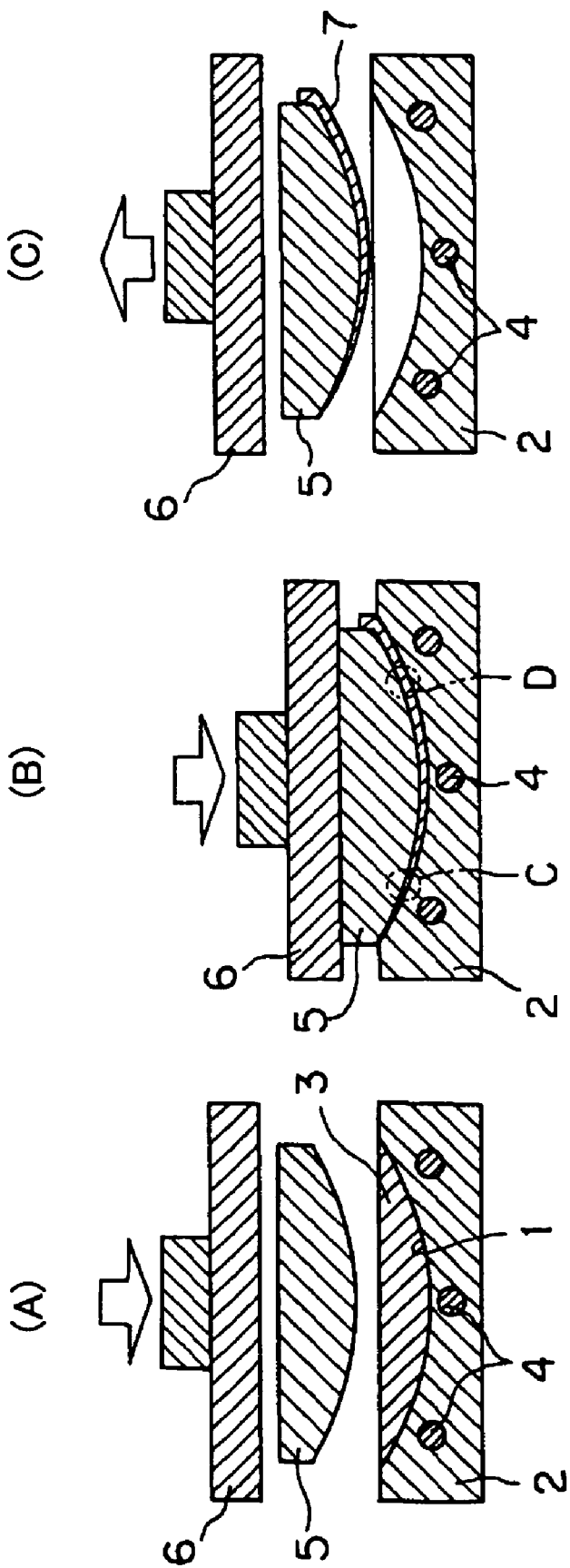
FIG. 2 is a schematic view of another example of the related art manufacturing method of the plastic laminate body.

Next, an advantage of the first embodiment of the present invention is discussed. According to the first embodiment of the present invention, even if the thickness of the laminate body 8 at the time of pressured becomes uneven as shown in FIG. 1 and FIG. 2 due to a position gap of the transfer surface 1 of the lower mold member 2 and the honeycomb substrate 9 or a configuration error depending on position, the excessive resin of the laminate member 8 is moved to the opening part 10, which is an escape part of the honeycomb-shaped substrate 9, so that the pressure distribution occurring at the time of pressuring can be eased. Hence, it is possible to realize a transfer with high precision.

Referring to FIG. 4, details of the above mentioned advantage of the first embodiment of the present invention are now discussed.

FIG. 4 is an enlarged view of parts corresponding to a part where the laminate member 8 is made thin, shown by a mark "E" in FIG. 3-(B), at the time of pressuring and a part where the laminate member 8 is made thick, shown by a mark "F" in FIG. 3-(B), at the time of pressuring. At the thinned part shown by the mark "E" wherein loaded pressure becomes large, a lot of the resin of the laminate member 8 is moved to the opening part 10 of the honeycomb substrate 9, so that the above mentioned pressure is reduced. At the thickened part shown by the mark "F" wherein loaded pressure becomes small, the amount of the resin moved to the opening part 10 of the honeycomb substrate 9 becomes small. That is, the amount of the resin moved to the opening part 10 of the honeycomb substrate 9 is changed depending on the loaded pressure, and therefore an even pressure as a whole is loaded.

In this embodiment, a plane shape film is used as the laminate member 8 and the laminate member 8 is deformed at the same time of pressurizing. However, a method for deforming the laminate member 8 to the desired configuration in the present invention is not limited to this embodiment. For example, as shown in FIG. 5, the laminate member 8 may be deformed to a configuration of the transfer surface 1 in advance. In this case, the laminate member 8 may be deformed to a configuration of the transfer surface 1 in advance by means of vacuum suction, for example.

Figure 6:
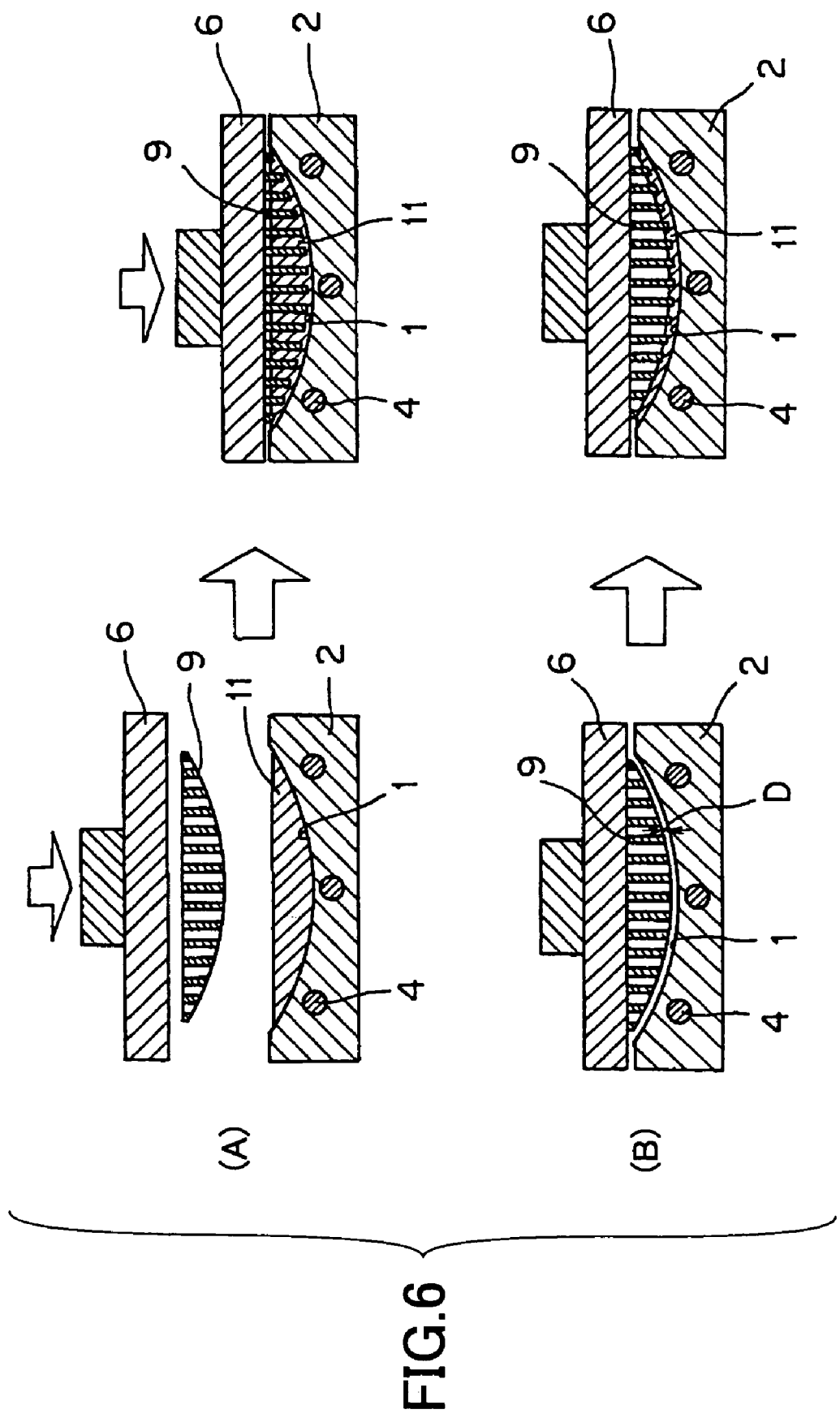
FIG. 6 is a schematic view showing other example of a modifying method of the laminate member provided at the plastic laminate body of the first embodiment of the present invention.

Furthermore, as shown in FIG. 6-(A), a liquid resin 11 is inserted into the lower mold member 2 in advance and then the honeycomb-shaped substrate 9 comes in contact with the liquid resin 11 (at this time, the excessive resin moves to the escape part) so that they can be made solid and uniform. In a case where the thermal plastic resin is used as the laminate member as discussed in the first embodiment, a liquid member that is heated and melted in advance is inserted into the lower mold member. However, the present invention is not limited the above mentioned example. For example, a thermal solid resin that is in a liquid state at a normal temperature may be used. In this case, after the honeycomb-shaped substrate 9 comes in contact with the thermal solid resin, the thermal plastic resin can be made solid by heating. Furthermore, as shown in FIG. 6-(B), the liquid state resin 11 may be inserted in the gap D after the transfer surface 1 and the honeycomb substrate 9 are faced so as to make a desired distance D between the transfer surface 1 and the honeycomb substrate 9.

Here, advantages, other than reduction of the pressure distribution, of the first embodiment of the present invention are discussed.

First, it is possible to correct a configuration of the honeycomb substrate 9 by melting the laminate member 8. Hence, it is possible to transfer the transfer surface 1 precisely. High precision of the honeycomb substrate 9 is not necessary and therefore it is possible to reduce cost.

Second, since only the laminate member 8 is heated and melted, it is possible to shorten the time for heating and cooling so that the molding cycle can be reduced. As for the thickness of the laminate member 8, only a thickness more than the configuration error of the honeycomb-shaped substrate 9 and the lower mold member 2 is required. Hence, if the honeycomb-shaped substrate 9 is processed so as to have a substantially final configuration, the above mentioned thickness can be reduced.

Third, since the substrate 9 has a honeycomb configuration, it is possible to reduce the weight of the substrate 9 while keeping rigidity of the laminate body.

Figure 7:
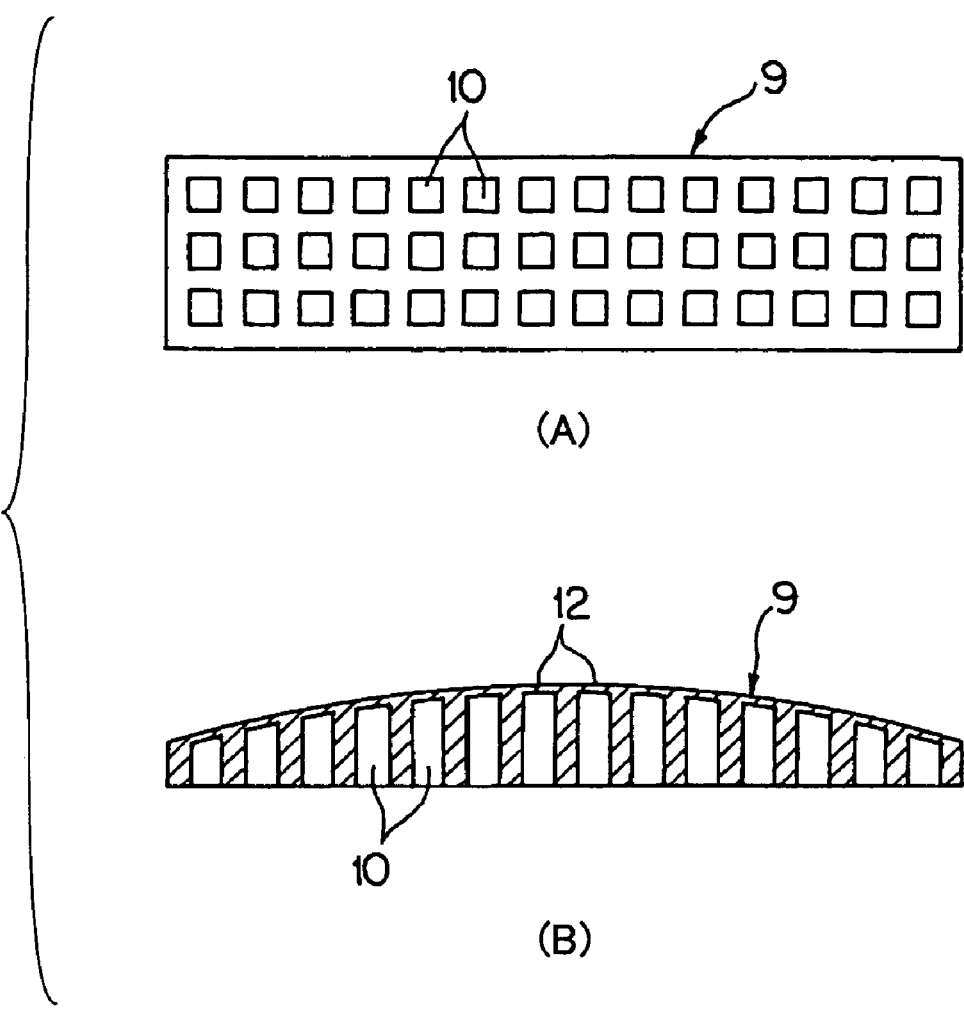
FIG. 7 is a schematic view if a honeycomb-shaped substrate provided at a plastic laminate body of a second embodiment of the present invention.
Figure 8:
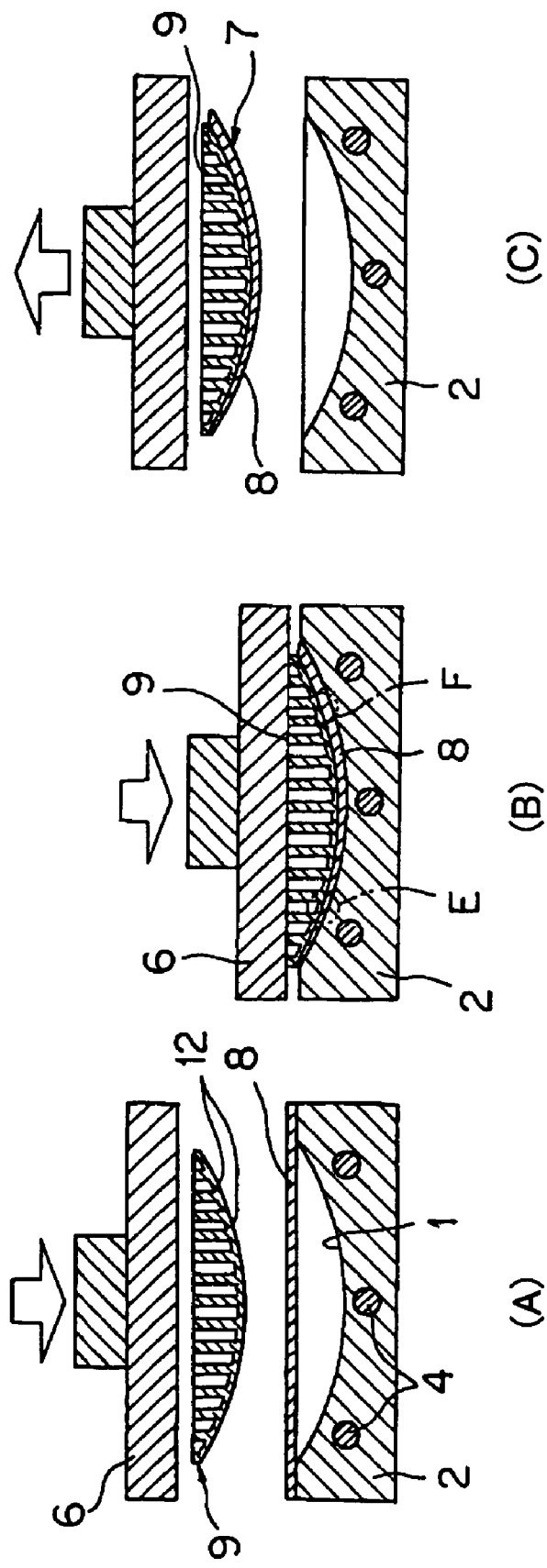
FIG. 8 is a schematic view showing a structure of a plastic laminate body and a manufacturing method of the same of the second embodiment of the present invention.

FIG. 7 is a schematic view of a honeycomb-shaped substrate provided at a plastic laminate body of a second embodiment of the present invention. More specifically, FIG. 7-(A) is a cross-sectional view of the substrate and FIG. 7-(B) is a back view of the substrate. FIG. 8 is a schematic view showing a structure of a plastic laminate body and a manufacturing method of the same of the second embodiment of the present invention.

A honeycomb-shaped substrate 9 has an escape part for the excessive resin of the laminate member 8 as shown in FIG. 7. Namely, a thin wall part 12, as an escape part, is formed at a surface where the laminate member 8 is laminated, of the opening part 10 formed in the honeycomb-shaped substrate 9. That is, only whether the thin wall part 12 is provided is the difference between the honeycomb-shaped substrate shown in FIG. 7 and the honeycomb-shaped substrate shown in FIG. 3. The rest of the structure of the honeycomb-shaped substrate shown in FIG. 7 is substantially the same as the rest of the structure of the honeycomb-shaped substrate shown in FIG. 3.

As shown in FIG. 8, the plastic laminate body can be manufactured by using the honeycomb-shaped substrate 9 shown in FIG. 7 in a similar way to the way shown in FIG. 3. In this case, a pressure distribution generated at the time of pressurizing by deforming the thin wall part 12 of the honeycomb-shaped substrate 9 is eased and therefore a transfer with high precision can be realized.

Referring to FIG. 9, detail of the above mentioned advantage of the second embodiment of the present invention are now discussed.

FIG. 9 is an enlarged view of parts corresponding to a part where the laminate member 8 is made thin, shown by a mark "E" in FIG. 8-(B), at the time of pressuring, and a part where the laminate member 8 is made thick, shown by a mark "F" in FIG. 8-(B), at the time of pressuring. At the thinned part shown by the mark "E" wherein the loaded pressure becomes large, the thin wall part 12 is largely deformed and the excessive resin is moved there, so that the above mentioned pressure is reduced. At the thickened part shown by the mark "F" wherein the loaded pressure becomes small, the amount of deformation of the thin wall part 12 is small and amount of the resin moved there becomes small. That is, the amount of deformation of the thin wall part 12, namely the amount of the resin moved, is changed depending on the loaded pressure, and therefore an even pressure as a whole is loaded.

Compared to the first embodiment, in the second embodiment, the manufacturing method of the substrate may be difficult. However, since the excessive resin is blocked by the thin wall part 12 and therefore does not continue moving to the opening part 10, the pressure distribution can be reduced stably without being influenced by the degree of viscosity. It is preferable that the thin wall part 12 has a thickness between 10 μm and 500 μm. If the thin wall part 12 has a thickness less than 10 μm, it is difficult to manufacture-process, and a crack may be generated by pressurizing at the time of unifying. In addition, if the thin wall part 12 has a thickness more than 500 μm, it is difficult to modify sufficiently at the time of pressurizing.

Figure 10:
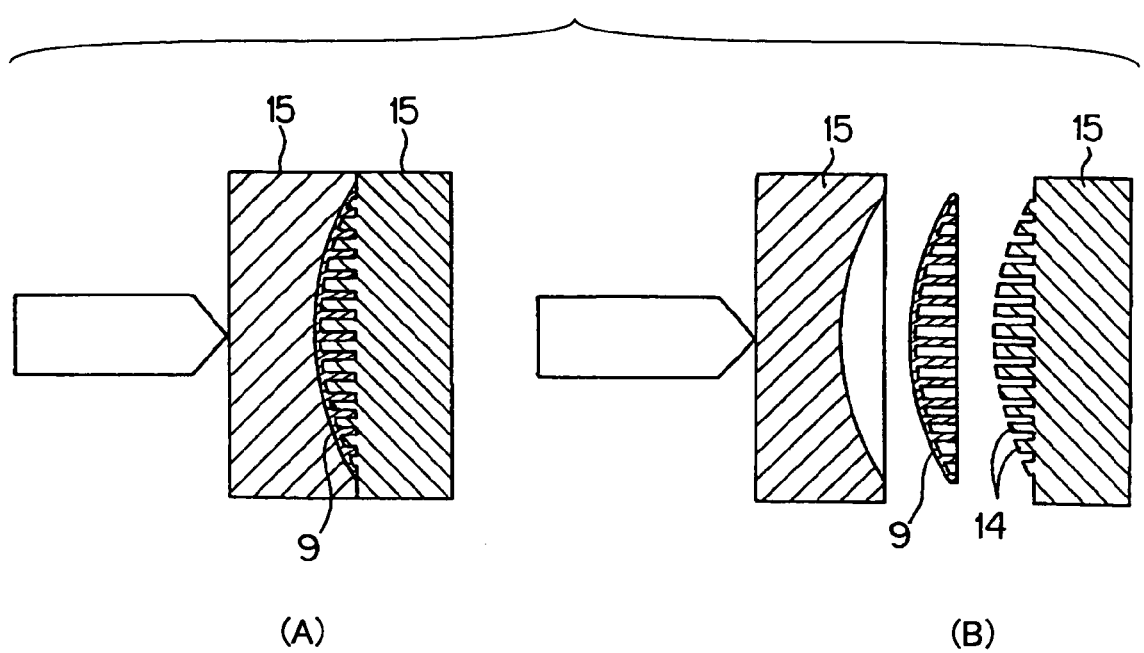
FIG. 10 is a schematic view showing a manufacturing method of a honeycomb-shaped substrate used for the plastic laminate body of the present invention.

FIG. 10 is a schematic view showing a manufacturing method of the above-discussed honeycomb-shaped substrate 9. Although a manufacturing method of the honeycomb-shaped substrate 9 where the thin wall part 12 is formed is shown in this example, this method can be applied to a honeycomb substrate 9 where a thin wall part is not formed. As shown in FIG. 10-(A), a polycarbonate resin molten in a cylinder is injected into and fills a mold 15 whose temperature is kept 130° C., which is a temperature less than the softening temperature of the resin, where a plurality of pins 14 are formed for forming a honeycomb structure in a cavity. After the polycarbonate resin is cooled at a temperature less than the softening temperature, the honeycomb-shaped substrate 9 is picked out from the mold 15. See FIG. 10-(B).

Figure 11:
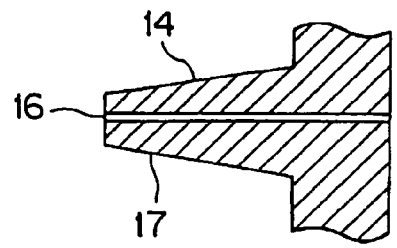
FIG. 11 is an enlarged view of a main part of a mold used for manufacturing a honeycomb-shaped substrate shown in FIG. 10.
Figure 12:
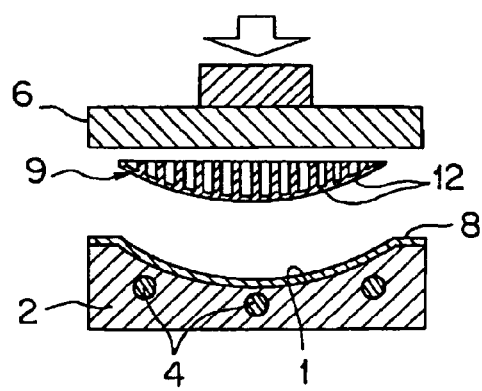
FIG. 12 is a schematic view showing another example of a modifying method of the laminate member provided at the plastic laminate body of the second embodiment of the present invention.
Figure 13:
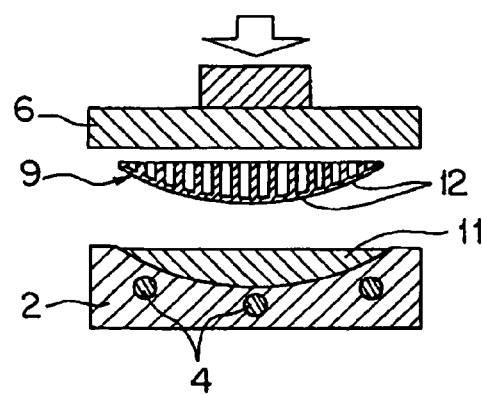
FIG. 13 is a schematic view showing other example of a modifying method of the laminate member provided at the plastic laminate body of the second embodiment of the present invention.

FIG. 11 is an enlarged view of one of the pins 14 formed in the cavity of the mold 15. A minute hole 16, connecting to a compressed gas supply source (not shown in FIG. 11) provided outside, is formed at a head end of the pin 14. Before the pin 14 is released from the mold, gas is provided from the hole 16.

Advantages of manufacturing the honeycomb substrate 9 are now discussed.

First, the manufacturing process can be done by normal injection molding. Hence the manufacturing process can be done easily and at low cost. As described above, in this embodiment, it is possible to correct the configuration at the time of unifying and therefore precision of the surface of the honeycomb-shaped substrate is not required.

Second, gas is provided from the pin 14 for forming the opening part 10 at a lower part of the thin wall part 12, so that an air layer is formed between the pin 14 and the resin at the time of mold releasing. Therefore, mold release resistance of the resin and pin 14 at the time of mold releasing is reduced and deformation at the time of mold releasing of the honeycomb-shaped substrate 9 can be prevented.

By making a side surface of the pin 14 have a taper configuration 17 as shown in FIG. 11, the mold release resistance of the resin and pin 14 the time of mold releasing is reduced and deformation at the time of mold releasing of the honeycomb-shaped substrate 9 can be prevented.

A porous plastic can be used as a material where the escape part for the excessive resin of the laminate member 8 is formed. In this case, it is not necessary to form the opening part 10 of the honeycomb-shaped substrate 9 as described above, that is, it is not necessary to devise to pull pins, by including a foaming material. Hence, it is possible to manufacture the substrate where the escape part for the excessive resin of the laminate member 8, more easily.

In the first and second embodiments, a two-layer structure of the honeycomb-shaped substrate 9 and the laminate member 8 is discussed. Here, as a third embodiment of the present invention, a three-layers structure is discussed with reference to FIG. 14.

Figure 14:
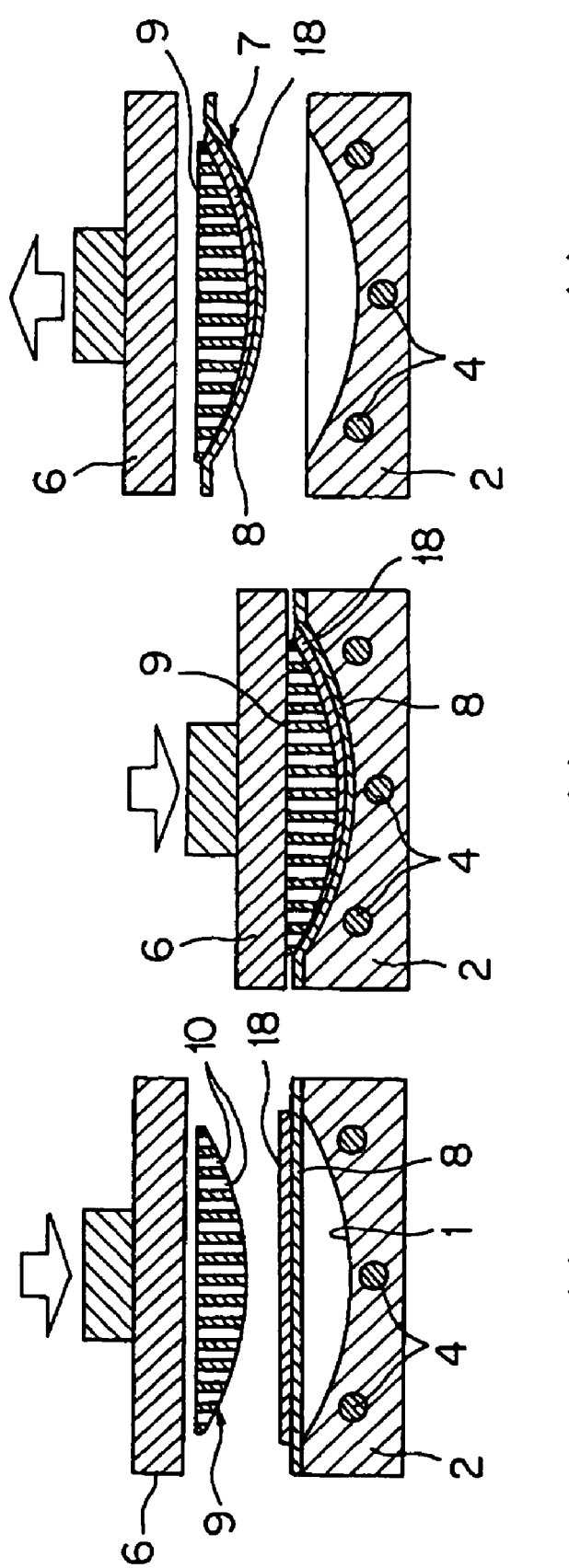
FIG. 14 is a schematic view showing a structure of a plastic laminate body and a manufacturing method of the same of a third embodiment of the present invention.

As shown in FIG. 14, a film-shaped laminate member 8, formed by a polyethylene terephthalate resin whose softening temperature is 260° C., is fixed on a lower mold member 2. An intermediate layer 18 formed by a urethane resin whose softening temperature is 110° C., is laminated at the side of the laminate surface of a honeycomb-shaped substrate 9, which side faces the film-shaped laminate member 8. The honeycomb-shaped substrate 9 is inserted between the intermediate layer 18 and an upper mold member 6, as shown in FIG. 14-(A). Although the honeycomb-shaped substrate 9 not having a thin wall part is used in this embodiment, the present invention is not limited to this honeycomb-shaped substrate 9. A honeycomb-shaped substrate having a thin wall part 12 may be used and a porous substrate may be used.

Next, an operation in the third embodiment is discussed. The upper mold member 6 is lowered down in a state shown in FIG. 14-(A). At this time, as in the first embodiment, the film-shaped laminate member 8 is pushed with pressure by the honeycomb-shaped substrate 9 so as to have a curved surface configuration. Next, the laminate member 8 comes in contact with the transfer surface 1 of the lower mold member 2. Finally, two members, namely the honeycomb-shaped substrate 9 and the laminate member 8, are pressurized and bonded. See FIG. 14-(B). At this time, a heating process is done at 130° C. that is higher than the softening temperature of the urethane resin forming the intermediate layer 18 and lower than the softening temperature of the polyethylene terephthalate resin forming the honeycomb-shaped substrate 9, by the heater 4 provided in the lower mold member 2. Next, after a cooling process is done at 100° C. that is lower than the softening temperature of the urethane resin, the upper mold member 6 is raised so that the unified laminate body 7 is picked out. See FIG. 14-(C).

Figure 16:
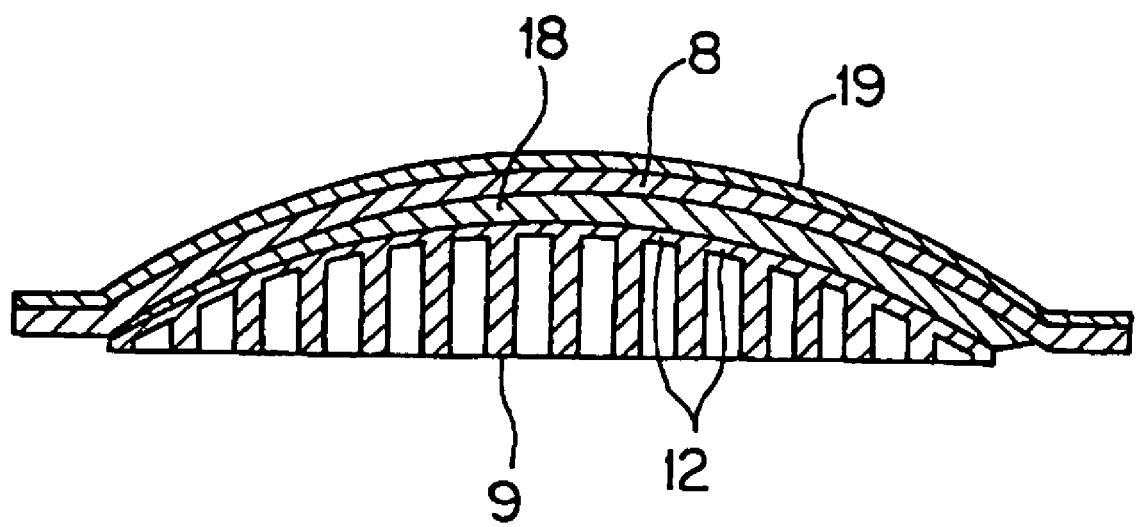
FIG. 16 is a view showing a cross-sectional structure of a plastic reflection mirror manufactured by the manufacturing method of the plastic laminate body of the present invention.

Next, an advantage of the third embodiment of the present invention is discussed. According to the third embodiment of the present invention, it is possible to ease the pressure distribution generated at the time of pressurizing so that a transfer with high precision can be realized. Furthermore, a substrate configuration can be corrected by melting the intermediate layer 18 so that the transfer surface 1 can be transferred precisely. The big difference regarding the advantage between this embodiment and the first or second embodiment is that, in this embodiment, it is possible to correct the configuration of the substrate and perform contact bonding of the laminate member 8, without melting the laminate member 8. In this case, it is possible to add a function such as a metal reflection film or a non-reflection coating to the laminate member 8 in advance. That is, since the laminate member 8 is not molten, even if the above-mentioned function is added to the laminate member 8, the function is not lost by unifying. For example, a large type curved surface mirror can be manufactured at low cost without a later vapor deposition process as shown in FIG. 16, by using a reflection film wherein the metal reflection film 19 is formed on the laminate member 8 in advance. As for adding a function to the laminate member 8 before it has been unified, it is possible to perform a continuous process such as roll shape winding. As compared with adding a function to the laminate member 8 after it has been unified, namely a batch process, cost for adding a function before the unifying process is less. In addition, if the laminate member is formed by a film less than 0.5 mm thickness, it is possible to easily deform the laminate member. Although in this embodiment, urethane resin is used for the intermediate layer 18, a hot melt type or thermal solid type bonding sheet may be used so that strong adhesion can be achieved. Manufacturing methods and plastic laminate bodies discussed in other embodiments can be applied to the large type curved surface mirror shown in FIG. 16.

Figure 15:
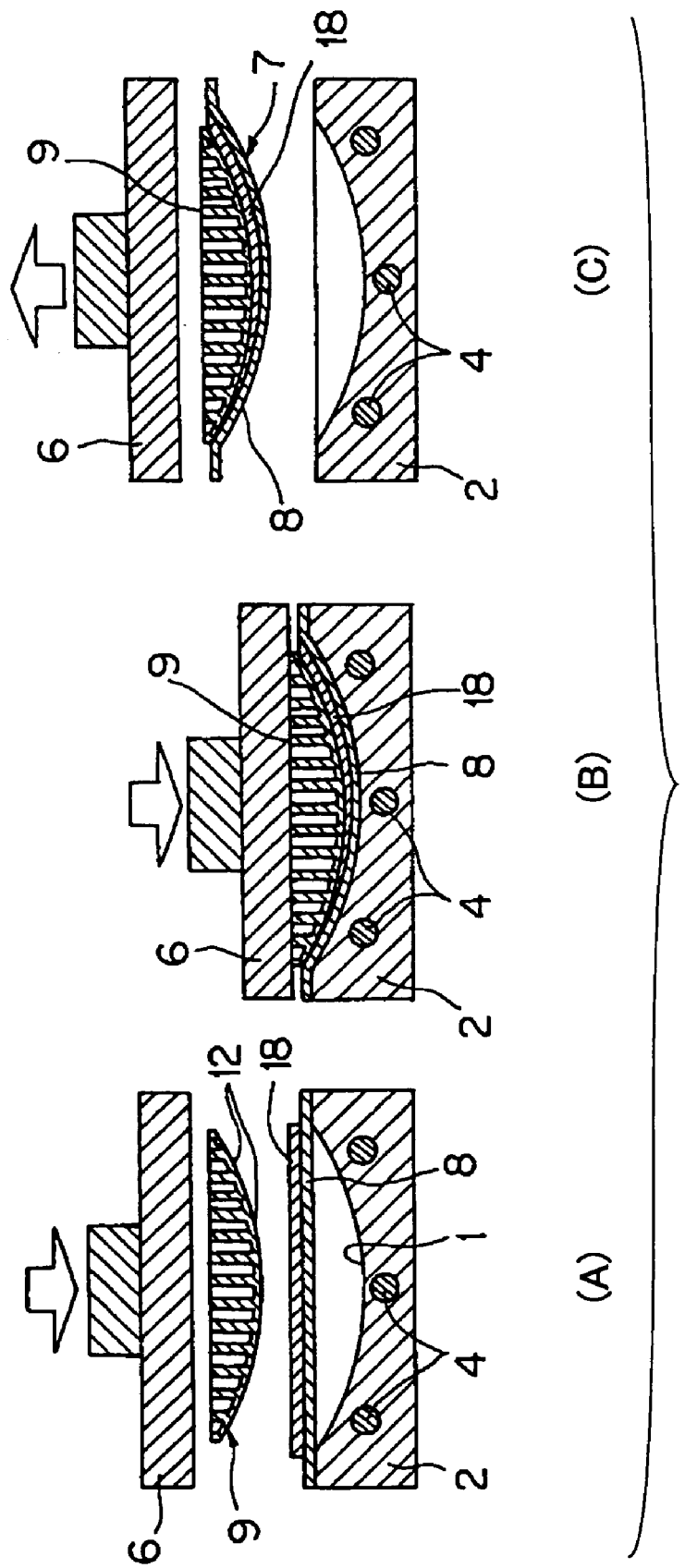
FIG. 15 is a schematic view showing a structure of a plastic laminate body and a manufacturing method of the same of a fourth embodiment of the present invention.

FIG. 15 is a schematic view showing a structure of a plastic laminate body and a manufacturing method of the same of a fourth embodiment of the present invention. The fourth embodiment is substantially the same as the third embodiment, but is different from the third embodiment only in that a honeycomb-shaped substrate having the thin wall part 12 is used in the fourth embodiment.

Figure 17:
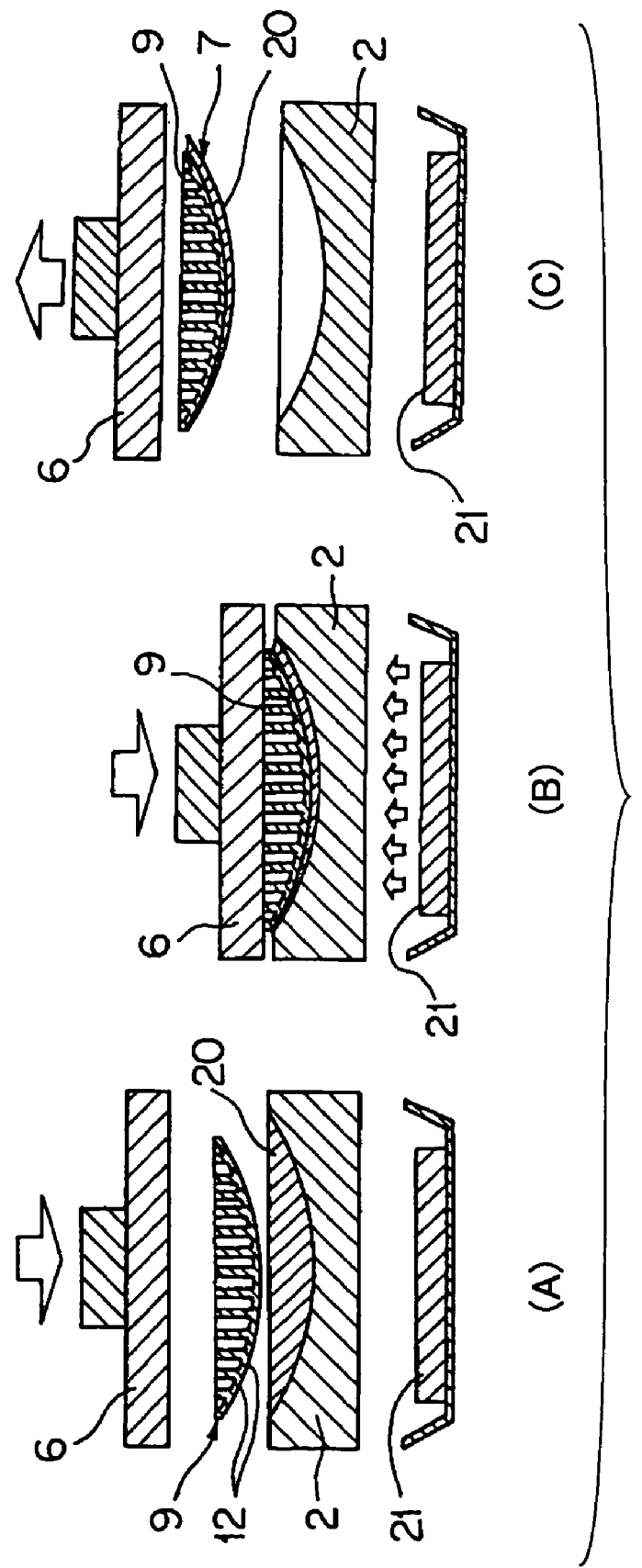
FIG. 17 is a schematic view showing a structure of a laminate unifying apparatus used for a manufacturing method of a plastic laminate body of a fifth embodiment of the present invention.
Figure 18:
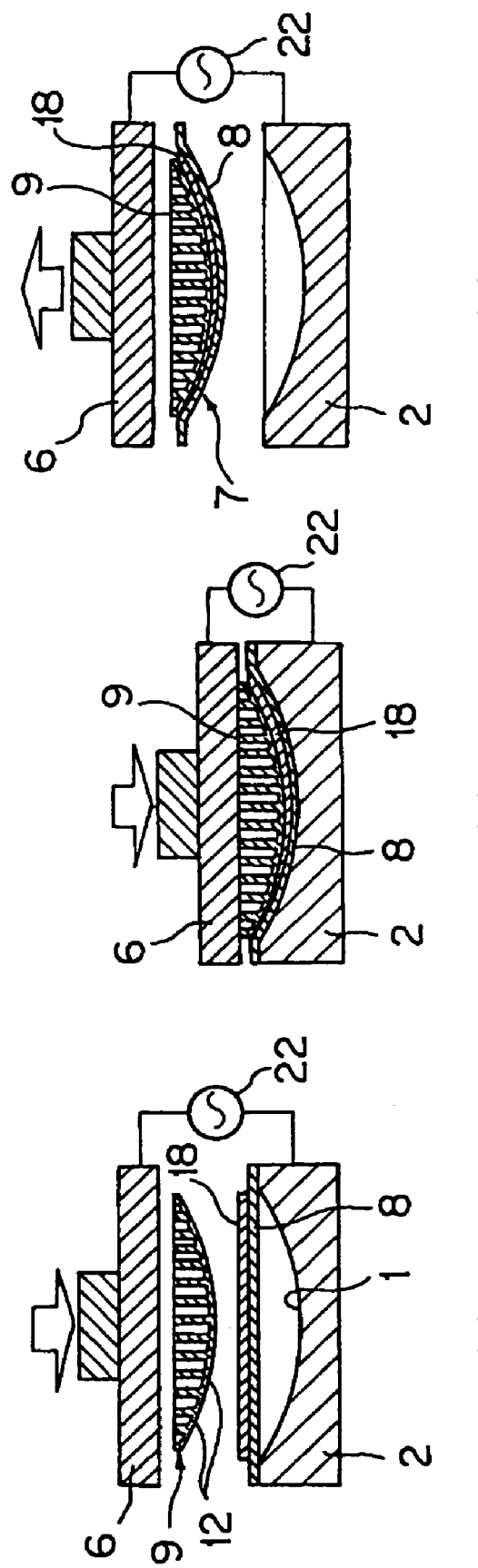
FIG. 18 is a schematic view showing a structure of a laminate unifying apparatus used for a manufacturing method of a plastic laminate body of a sixth embodiment of the present invention.

FIG. 17 is a schematic view showing a structure of a laminate unifying apparatus used for a manufacturing method of a plastic laminate body of a fifth embodiment of the present invention. Although the honeycomb-shaped substrate having the thin wall part of the second embodiment shown in FIG. 17 and. FIG. 18 is described below, the honeycomb-shaped substrate not having the thin wall part of the first embodiment may also be used in this embodiment.

Here, only the difference between this embodiment and the first or second embodiment in the case of the two-layers structure of the laminate member 8 and the honeycomb-shaped substrate 9 discussed in the first or second embodiment is discussed. An ultraviolet solid type resin 20 is inserted in the cavity where a transfer surface 1 of the lower mold member 2 formed by ultraviolet permeable quartz is formed.

The honeycomb-shaped substrate 9 is inserted between the above-mentioned lower mold member 2 and the upper mold member 6. See FIG. 17-(A). An ultraviolet irradiation apparatus 21 is provided at a lower part of the lower mold member 2 so that an ultraviolet light can be applied to the ultraviolet solid type resin 20.

Next, an operation in the fifth embodiment is discussed. The upper mold member 6 is lowered down in a state shown in FIG. 17-(A). The honeycomb-shaped substrate 9 comes in contact with the ultraviolet solid type resin 20, and both of them are pressurized and bonded. See FIG. 17-(B). At this time, the ultraviolet light can be applied to the ultraviolet solid type resin 20 via the lower mold member 2 by the ultraviolet irradiation apparatus 21 provided at a lower part of the lower mold member 2. As a result of this, the ultraviolet solid type resin 20 is made solid, and adhered to and unified with the honeycomb-shaped substrate 9. Next, the upper mold member 6 is raised so that the unified laminate body 7 is picked out. See FIG. 17-(C).

Next, an advantage of the fifth embodiment of the present invention is discussed. According to the fifth embodiment of the present invention, as well as the first and second embodiments, it is possible to ease the pressure distribution generated at the time of pressurizing by the excessive resin of the laminate member 8 escaping to the opening part 10 or thin wall part 12 of the honeycomb-shaped substrate 9, and thereby transfer with high precision can be realized.

Furthermore, in this embodiment, it is possible to correct the surface configuration of the honeycomb-shaped substrate 9 by the ultraviolet solid resin 20, and thereby the transfer surface 1 can be transferred precisely. The big difference regarding the advantage between this embodiment and the first or second embodiment is that, in this embodiment, it is possible to dramatically shorten the process cycle because the heating and cooling processes are not required. In addition, if the ultraviolet permeable member is used as the laminate member 8, this embodiment can be applied to the three-layer structure as discussed in the third embodiment wherein the intermediate layer 18 is used.

FIG. 18 is a schematic view showing a structure of a laminate unifying apparatus used for a manufacturing method of a plastic laminate body of a sixth embodiment of the present invention. Here, a three-layer structure of the honeycomb-shaped substrate 9 discussed in the third embodiment, the laminate member 8, and the intermediate layer 18, are discussed. A high frequency generation apparatus 22 is connected to the upper mold member 6 and the lower mold member 2 so that an electrical current having a frequency higher than 1 MHz can be applied. Structural members of the honeycomb-shaped substrate 9 and the laminated member 8 fixed to the lower mold member 2 are formed under conditions that a multiplied result of a dielectric constant $\epsilon$ and a dielectric tangent $\delta$ thereof is smaller than 0.01, namely $\epsilon \times \tan \delta < 0.01$. Also, structural members of the intermediate layer 18 are formed under conditions that a multiplied result of a dielectric constant $\epsilon'$ and a dielectric tangent $\delta'$ of the intermediate layer 18 is larger than 0.01, namely $0.01 < \epsilon' \times \tan \delta'$, preferably larger than 0.05, namely $0.05 < \epsilon' \times \tan \delta'$. For example, as the structural members of the honeycomb-shaped substrate 9 and the laminated member 8, a polyethylene terephthalate resin, polystyrene resin, polyethylene resin, polyetherimide resin, polyphenylene ether resin, or the like, is used. As the structural members of the intermediate layer 18, a polyvinyl chloride resin, methacryl resin, polycarbonate resin, ethylene vinyl acetate copolymer resin, or the like, is used. In this embodiment, the polyetherimide resin is used for the honeycomb-shaped substrate 9, the polyethylene terephthalate resin is used for the laminated material 8, and the ethylene vinyl acetate copolymer resin is used for the intermediate layer 18.

Next, an operation in the sixth embodiment is discussed. First, the honeycomb-shaped substrate 9 is inserted between the intermediate layer 18 and the upper mold member 6. See FIG. 18-(A). Next, the upper mold member 6 is lowered down in a state shown in FIG. 18-(A). At this time, as in the third embodiment, the film-shaped laminate member 8 is pushed with pressure by the honeycomb-shaped substrate 9 so as to have a curved surface configuration. Next, the laminate member 8 comes in contact with the transfer surface 1 of the lower mold member 2. Finally, two members, namely the honeycomb substrate 9 and the laminate member 8, are pressurized and bonded. See FIG. 18-(B). Next, a high frequency electrical current is applied by the high frequency generation apparatus 22. After a cooling process is done at a temperature that is lower than the softening temperature of the intermediate layer 18, the upper mold member 6 is raised so that the unified laminate body 7 is picked out. See FIG. 18-(C).

Next, an advantage of the sixth embodiment of the present invention is discussed. According to the sixth embodiment of the present invention, as well as the third embodiments, it is possible to ease the pressure distribution generated at the time of pressurizing by the escape of the excessive resin of the laminate member 8 to the opening part 10 or thin wall part 12 of the honeycomb-shaped substrate 9, and thereby transfer with high precision can be realized. Furthermore, a substrate configuration can be corrected by melting the intermediate layer 18 so that the transfer surface 1 can be transferred precisely.

Furthermore, in the sixth embodiment, if a high frequency electrical current is applied, an intensive movement of a dipole inside of the plastic member occurs so that the plastic member itself self-heats because of friction heat of the movement. The heat value of this case is in proportion to sizes of the dielectric constant $\epsilon$ and the dielectric tangent $\delta$ that are values of physical properties peculiar to members.

In this embodiment, structural members of the intermediate layer 18 are formed under conditions that a multiplied result of a dielectric constant $\epsilon'$ and a dielectric tangent $\delta'$ of the intermediate layer 18 is larger than 0.01, namely $0.01<\epsilon'\times\tan\delta'$, preferably larger than 0.05, namely $0.05<\epsilon'\times\tan\delta'$. Because of this, it is possible to selectively heat the intermediate layer 18 without heating the laminated member 8 and the honeycomb-shaped substrate 9. That is, in this embodiment, since the intermediate layer 18 alone can be selectively heated and heat response is extremely speedy, it is possible to extremely shorten the process cycle. Furthermore, in this embodiment, unlike the fifth embodiment, there is no limitation of structural members of the mold member, and therefore it is possible to select a proper member by considering the strength as a mold member.

The high frequency heating way of this embodiment can be applied to the two-way structure as shown in the first and second embodiments by forming the laminate member 8 with structural members under conditions that a multiplied result of a dielectric constant $\epsilon$ and a dielectric tangent $\delta$ is larger than 0.01, namely $0.01<\epsilon\times\tan\delta$.

The present invention can be applied in a case where a mirror surface is formed with high precision as the transfer surface 1 and a case where a minute pattern is formed.

Figure 19:
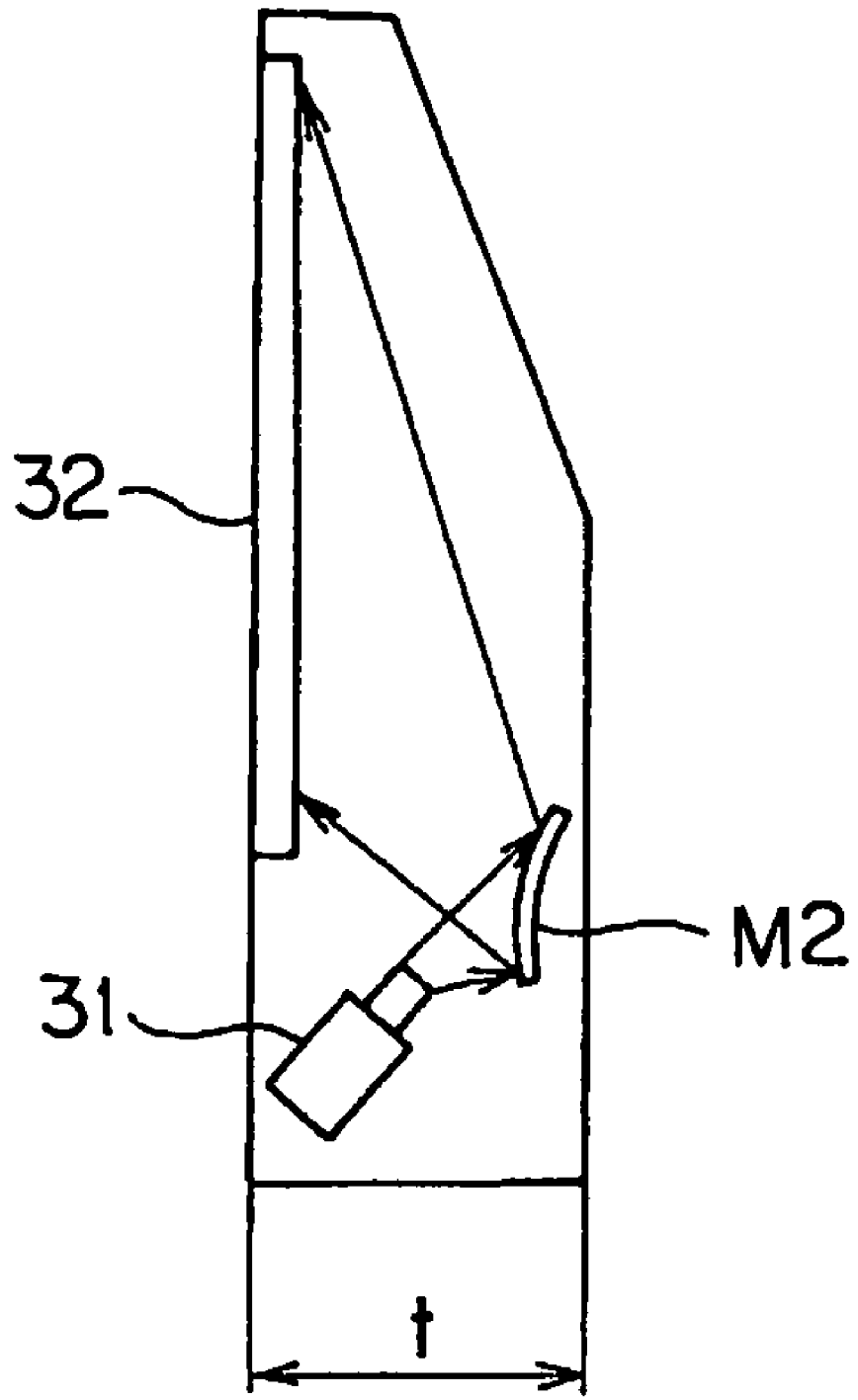
FIG. 19 is a schematic view of a real projection type image display apparatus having the plastic reflection mirror shown in FIG. 16.

FIG. 19 is a schematic view of a rear projection type image display apparatus having the plastic reflection mirror shown in FIG. 16. As shown in FIG. 19, by applying the large size curved surface mirror (projection mirror) manufactured by the method of this embodiment to a rear projection display, it is possible to spread the optical path so that a thickness t of the rear projection can be reduced.

Furthermore, by using the large size curved surface mirror manufactured by the method of this embodiment, it is possible to make a thin type rear projection display (rear projection type image display apparatus) shown in FIG. 19 having a high quality image. Here, in FIG. 19, a numerical reference "31" represents an optical engine formed by a crystal liquid panel or a projecting lens, and a numerical reference "32" represents a screen.

The present invention is not limited to these embodiments, but variations and modifications may be made without departing from the scope of the present invention. For example, although the honeycomb-shaped substrate and the porous body are discussed as an example of the escape part in the above mentioned examples, other structures can be applied as long as the escape part can be formed. In addition, although the opening part of the honeycomb-shaped substrate shown in FIG. 7 has a square configuration, the opening part may have a configuration of a round shape, elliptic shape, polygon or regular polygon such as a rectangular shape, triangle, rectangle, pentagon, hexagon, or the like.

This patent application is based on Japanese Priority Patent Application No. 2003-077198 filed on Mar. 20, 2003, and Japanese Priority Patent Application No. 2003-378557 filed on Nov. 7, 2003, the entire contents of which are hereby incorporated by reference.

What is claimed is:

1. A manufacturing method of a plastic laminate body, the plastic laminate body having at least one plastic laminate member that is laminated on a plastic substrate, which plastic substrate includes a honeycomb structure with a thin wall part and a thick wall part thicker than the thin wall part and formed to cover an opening part of the honeycomb structure, the opening part facing a laminate surface of the plastic laminate member, the plastic substrate is pre-processed in advance so as to have a substantially final configuration, the manufacturing method comprising:

softening the plastic laminate member; and pressing a transfer surface of a mold member, which is pre-processed in advance so as to have a desired configuration, against the plastic laminate member with pressure so that the transfer surface of the mold member is transferred to the surface of the plastic laminate member and so that an excessive portion of the plastic laminate member is moved to an escape part formed by deforming the thin wall parts according to pressure loaded at a time when the mold member is pressed against the plastic laminate member.

2. The manufacturing method of a plastic laminate body as claimed in claim 1, wherein a thickness of the thin wall part is equal to or more than 10 μm and equal to or less than 500 μm.

3. The manufacturing method of a plastic laminate body as claimed in claim 1, wherein the plastic substrate having the honeycomb structure is formed by filling a mold with a molten resin at high pressure, wherein a plurality of pins for forming the honeycomb structure at a cavity are provided.

4. The manufacturing method of a plastic laminate body as claimed in claim 3, wherein gas is given to an interface of the pins and the resin before the pins provided in the cavity of the mold are pulled out from the resin filling the cavity.

5. The manufacturing method of a plastic laminate body as claimed in claim 1, wherein the plastic laminate member is softened at the time when the mold member is pressed against the plastic laminate member, so that a substantial final and desired surface configuration of the plastic substrate is corrected and the plastic laminate member and the plastic substrate are bonded in one body.

6. The manufacturing method of a plastic laminate body as claimed in claim 5, wherein a structural member of the plastic laminate member is formed by a thermoplastic member whose softening temperature T1 is lower than a softening temperature T2 of a structural member of the plastic substrate, and the plastic laminate member is heated so as to have a temperature equal to and more than the softening temperature T1 and equal to and less than the softening temperature T2 when the mold member is pushed with the pressure after the plastic laminate member is laminated on a laminate surface of the plastic substrate, so that the plastic laminate member and the plastic substrate are bonded in one body.

7. The manufacturing method of a plastic laminate body as claimed in claim 5, wherein a structural member of the plastic laminate member is formed by an ultraviolet curing type resin and an ultraviolet light is applied when the mold member is pushed with the pressure after the plastic laminate member is laminated on a laminate surface of the plastic substrate, so that the plastic laminate member and the plastic substrate are bonded in one body.

8. The manufacturing method of a plastic laminate body as claimed in claim 5,
wherein structural members of the plastic substrate and the plastic laminate member are formed under conditions that a multiplied result of a dielectric constant $\epsilon$ and a dielectric tangent $\delta$ of the plastic substrate is smaller than 0.01, namely $\epsilon \times \tan \delta < 0.01$, and a multiplied result of a dielectric constant $\epsilon'$ and a dielectric tangent $\delta'$ of the plastic laminate member is larger than 0.01, namely $0.01 < \epsilon' \times \tan \delta'$, and
the plastic laminate member is softened by a high frequency dielectric heating process, when the mold member is pushed with the pressure after the plastic laminate member is laminated on a laminate surface of the plastic substrate, so that the plastic laminate member and the plastic substrate are bonded in one body.

9. The manufacturing method of a plastic laminate body as claimed in claim 1,
wherein a plastic intermediate layer is inserted between the plastic laminate member and the plastic substrate, and the plastic intermediate layer is softened at the time when the mold member is pushed with pressure, so that a substantial final and desired surface configuration of the plastic substrate is corrected and the plastic laminate member and the plastic substrate are bonded in one body.

10. The manufacturing method of a plastic laminate body as claimed in claim 9,
wherein a structural member of the plastic intermediate layer is formed by a thermoplastic member whose softening temperature T3 is lower than a softening temperature T2 of a structural member of the plastic substrate, and
the plastic laminate member is heated so as to have a temperature equal to or more than the softening temperature T3 and equal to or less than the softening temperature T2 when the mold member is pushed with the pressure after the plastic intermediate layer and the plastic laminate member are laminated in turn on a laminate surface of the plastic substrate, so that the plastic laminate member and the plastic substrate are bonded in one body.

11. The manufacturing method of a plastic laminate body as claimed in claim 9,
wherein a structural member of the plastic intermediate layer is formed by an ultraviolet curing type resin and an ultraviolet light is applied when the mold member is pushed with the pressure after the plastic intermediate layer and the plastic laminate member are laminated in turn on a laminate surface of the plastic substrate, so that the plastic laminate member and the plastic substrate are bonded in one body.

12. The manufacturing method of a plastic laminate body as claimed in claim 9,
wherein structural members of the plastic substrate and the plastic laminated member or the plastic intermediate layer are formed under conditions that a multiplied result of a dielectric constant $\epsilon$ and a dielectric tangent $\delta$ of the plastic substrate is smaller than 0.01, namely $\epsilon \times \tan \delta < 0.01$, and a multiplied result of a dielectric constant $\epsilon'$ and a dielectric tangent $\delta'$ of the plastic laminated member or the plastic intermediate layer is larger than 0.01, namely $0.01 < \epsilon' \times \tan \delta'$, and
the plastic laminate member or the plastic intermediate layer is selectively softened by a high frequency dielectric heating process, when the mold member is pushed with the pressure after the plastic intermediate layer and the plastic laminate member are laminated in turn on a laminate surface of the plastic substrate, so that the plastic laminate member and the plastic substrate are bonded in one body.

13. The manufacturing method of a plastic laminate body as claimed in claim 9,
wherein the plastic intermediate layer is formed by a heat curing type bonding member whose bonding temperature is lower than a softening temperature of the plastic substrate or a hot melt type bonding member, and
a heating or pressurizing process is applied so that the plastic laminate member and the plastic substrate are bonded in one body.

14. The manufacturing method of a plastic laminate body as claimed in claim 1,
wherein the plastic laminate member is formed by a plastic film having a thickness equal to or less than 0.5 mm.

* * * * *